H. BLUMENBERG.
PROCESS OF TREATING BORAX ORES.
APPLICATION FILED APR. 26, 1916.
1,259,717.
Patented Mar. 19, 1918.
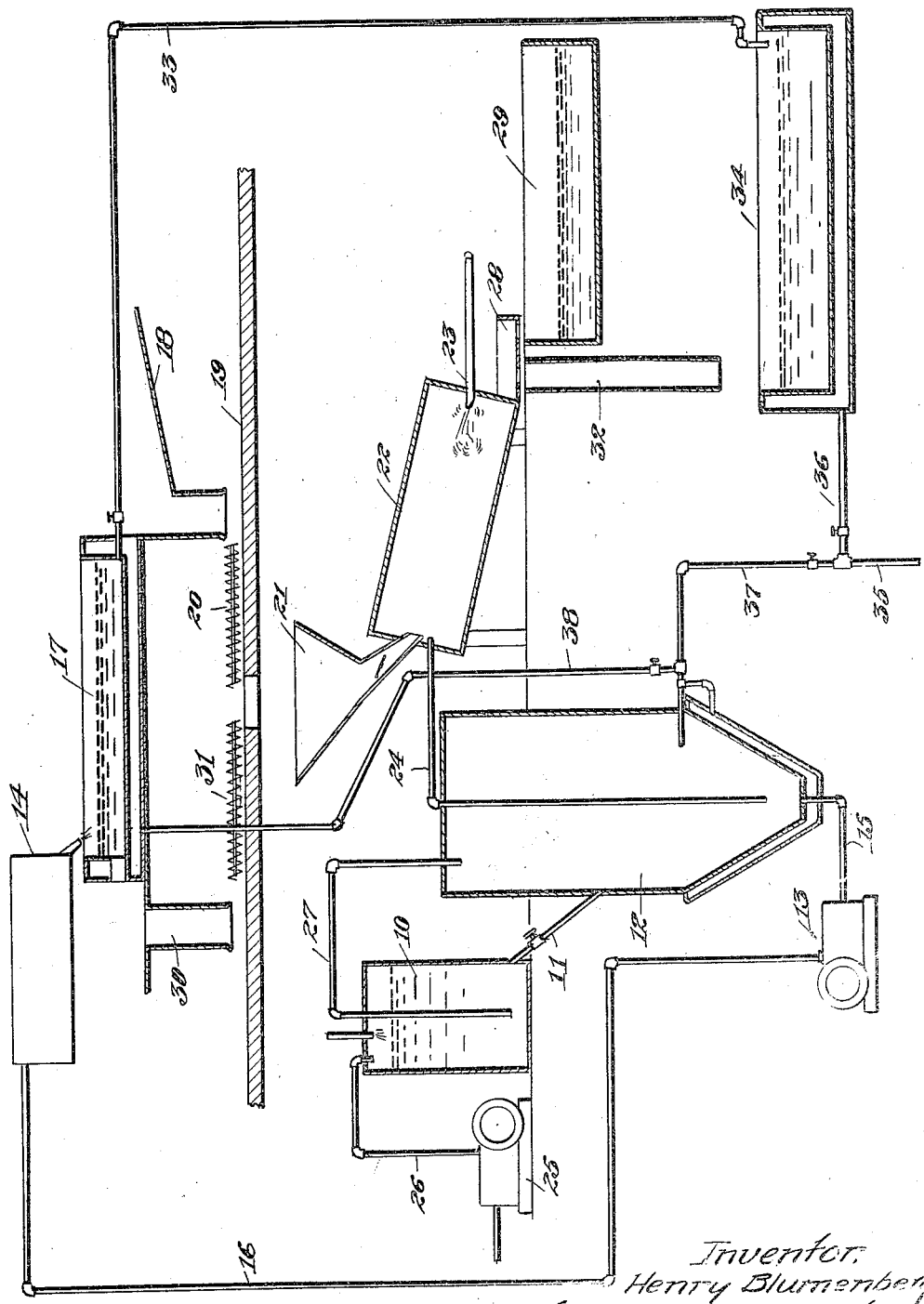
Inventor.
Henry Blumenberg
by Hazard Berry & Miller

UNITED STATES PATENT OFFICE.

HENRY BLUMENBERG, OF LOS ANGELES, CALIFORNIA, ASSIGNOR, BY MESNE ASSIGNMENTS, TO CLIFFORD I. HINMAN, OF LOS ANGELES, CALIFORNIA.

PROCESS OF TREATING BORAX ORES.

1,259,717.     Specification of Letters Patent.     Patented Mar. 19, 1918.

Application filed April 26, 1916. Serial No. 93,763.

*To all whom it may concern:*

Be it known that I, HENRY BLUMENBERG, a citizen of the United States, residing at Los Angeles, in the county of Los Angeles and State of California, have invented new and useful Improvements in Processes of Treating Borax Ores, of which the following is a specification.

My invention relates to a process of treating borax ores such as the borates of the alkali and alkaline earth metals, likewise the boro-silicates of the alkali and alkaline earth metals.

It is a well known fact that at the present time, the calcium boro-silicates such as danburite, and howlite, cannot be profitably concentrated for commercial purposes owing to the excessive cost of extracting the boric acid from this class of ores; neither can the lower grades of pandermite and colemanite, which are calcium borate ores, be successfully treated for the same reasons. Mostly all the calcium borate in the United States is mined in California, and the largest consumption of borax is on the Atlantic coast. The best known practical commercial method of decomposing calcium borate is by roasting, which is expensive and is limited to the calcium borate solely, as the calcium boro-silicates as a rule do not contain boric acid in sufficient quantities to make the roasting process profitable.

I am aware that various processes have been suggested for chemically decomposing the ores of calcium borates and the calcium boro-silicates, and which involve the use of sulfuric acid, sulfurous acid fumes injected with compressed air, or steam or hydrocloric acid. I am also acquainted with the double decomposition processes such as heating the finely ground ore either in solution or by fusion with the various sulfates, carbonates, bicarbonates, etc. All the processes mentioned leave, as a rule, by-products which have practically no commercial value. Furthermore, said processes are too expensive, so that they are not a commercial success for the reason that the crude material is either too low grade or the ore is geographically situated where said processes cannot be profitably applied.

It is a well known fact that at present the only practical process for concentrating the crude boric ores profitably is the roasting method, and even this method yields a finished product of not more than 40% or 45% purity, commonly called borax flour, which is sacked and shipped from California to the refineries at eastern points. Over 50% of the total material shipped is waste material. By my novel process, practically no valueless by-products are produced. The reducing agents employed are extracted and used over and over again in the cycle of operation. Furthermore no high temperatures are required in any step of my process.

My process depends on the following chemical reactions, namely that a calcium borate is soluble in nitric acid and that boric acid is far less soluble than the calcium nitrate, and can be easily separated therefrom by crystallization. Calcium nitrate at comparatively low temperatures will again give up its nitric acid oxids, making the nitric oxid gases available for the succeeding operations. The by-product, burnt lime has a good market. Or calcium nitrate may be used as such, and has higher market value than the corresponding sodium salt. The citrus groves of southern California are within 200 miles of most of the borax mines of California, and thus furnish a large available market for calcium nitrate as a fertilizer. My process will take almost any grade of ore and eliminate entirely the silicate, and will bring up the boric acid content to over double that obtained by the old processes, thereby reducing the freight charges one-half. The process involves the following cycle of operations. The boric acid from the first operation is heated with sodium nitrate, sodium borate is produced and nitrogen oxids are liberated which latter may be used as nitric acid for the treatment of the next batch of calcium borate for its reduction to boric acid, thus repeating the cycle of operation. My process may be used for producing from calcium borate either boric acid and calcium nitrate, or sodium borate and nitric acid, thus utilizing the nitric acid to continue the operation indefinitely. Any kind of borax ore can be used and concentrated to over double the present methods of concentration. The market conditions will determine the production of one set or the other of the products as most profitable.

My process is based on the fact that boric acid in fusion in the presence of an alkali base will drive off any other acid radical which is the exact reverse to what will occur in solution.

My process eliminates all roasting and grinding as practically no insoluble lime salts are present, and consequently the filter pressing at the refining end is greatly reduced.

My novel method comprises dissolving the ore in nitric acid, thereby producing calcium nitrate and boric acid and mixing the boric acid with sodium nitrate, producing a sodium borate and nitric acid, the latter of which may be used for dissolving the ore for producing another batch of calcium nitrate and boric acid. The great practical advantage of my process consists in the fact that from the ores may be produced either boric acid or borax; no crushing, grinding or roasting at a high temperature is necessary; the decomposing agent can be used over and over again, or sold as calcium nitrate at a better price than its original cost, as sodium nitrate. Furthermore, the end product has at least double the boric acid contents of the products produced by the present methods, thus reducing the transportation charges to the point of consumption. In the refining of my product by crystallization, a large part of the filter press expense is eliminated, as there is very little lime cake to handle.

My process is practical and economical for the reason that calcium nitrate gives up its nitrogen oxids at a low temperature while all the other known methods which use sulfuric, sulfurous and hydrochloric acids leave by-products that have practically no commercial value. Furthermore, the old methods involve the use of excessive heat, thereby destroying the apparatus, and likewise increasing the expense of operation. Another advantage of my process is the latitude, allowing any products to be produced to suit the market conditions, to wit, borax, boric acid, lime, nitric acid and calcium nitrate.

The claims of the present application are limited to a treatment of borax ores with nitric acid, to produce boric acid and borates of alkali metal, respectively. Other inventions disclosed, but not claimed herein, are covered by my divisional applications, Serial Number 131,785, filed November 16, 1916, and Serial Number 131,786, filed November 16, 1916.

My invention will be better understood with the aid of the accompanying drawings which illustrate diagrammatically the apparatus used for carrying out my process.

The crushed borax ore is introduced in a closed predigester tank 10 where it is treated with a weak solution of nitric acid. A valved outlet pipe 11 leads from the bottom of tank 10 to the main digester 12 where the ore is treated with a strong solution of nitric acid, which acting upon the calcium borate will form calcium nitrate and boric acid. The ore will be dissolved to such an extent that the same may be easily handled by a pump 13, pumping the treated ore in solution from the bottom of the digester 12 to a filter press 14. 15 designates the pipe line leading from the bottom of the digester 12 to the pump 13, while 16 designates the pipe line leading from said pump to the filter press 14. The filtrate is led from the filter press 14 to a steam jacketed evaporating tank or crystallizer 17. Owing to the fact that boric acid is sparingly soluble in water while calcium nitrate is highly soluble, the boric acid on cooling will crystallize out and may be removed from the evaporating pan to a drying platform 18.

The boric acid if so desired may be used as the end product and the calcium nitrate may be concentrated and mixed with calcium oxid and evaporated to dryness to form a basic calcium nitrate.

If it is desired to make borax, the boric acid is moved from the drying platform 18 to a mixing floor 19 where it is mixed with sodium nitrate in proper proportion so that the sodium of the nitrate will be of the proper amount to form borax glass. The mixture of boric acid and sodium nitrate are conveyed from the mixing floor by suitable conveying means 20 to a hopper 21 leading to a converter 22. The converter is provided with suitable heating means such as a fuel nozzle 23. By heating the mixture of boric acid and sodium nitrate, borax glass and nitric acid will be formed.

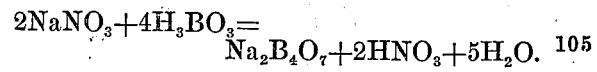

$$2NaNO_3 + 4H_3BO_3 = Na_2B_4O_7 + 2HNO_3 + 5H_2O.$$

The nitric acid radical of the sodium nitrate combines with the hydrogen of the boric acid and will be driven off. The nitric acid fumes are led from the converter 22 by a pipe line 24 into the digester 12 where the nitric acid fumes will be absorbed by the water therein, and are utilized for treating another batch of borax ores. An exhaust pump 25 is operated to produce a partial vacuum of seven and one-half pounds to the square inch. The pump 25 is operatively connected to the digester 12 by means of a pipe line 26 leading from said vacuum pump to the top of the predigester 10. The pipe line 27 leads from the top of the digester 12 to near the bottom of the predigester 10. It is thus seen that the suction of the vacuum pump 25 will cause the nitric acid and nitrogen oxid fumes from the converter 22 to pass to the digester 12 and will suck any oxid fumes which may collect at the top of the digester 12 to the predigester 10 in which practically all the nitrogen oxid fumes will be absorbed, In order to reduce any losses by decomposition of the nitrate to a minimum, it is important not to exceed a temperature of 1000 degrees C in the converter 22. Furthermore, the nitrogen oxid and nitric acid fumes should be mixed with oxygen to convert the lower nitrogen oxids to the higher oxids and steam, and removed as rapidly as possible from the converter 22. These conditions are obtained by supplying an excess of air with the air of combustion for the fuel supply 23, and operating the suction pump 25. By supplying oxygen and steam to the nitrogen oxids and by the immediate removal of the nitrogen oxids, the losses of nitric acid are reduced to a minimum.

From the converter 22, the fused borax glass may be run through a chute 28 to a suitable tank or vessel 29 partially filled with water from which the borax glass may be conveniently removed.

If it is desired to treat the calcium nitrate further for other products, the same is concentrated and then removed from the evaporator 17 through a chute 30 thence by a suitable conveying means 31 to the hopper 21 leading to the converter 22 where it is roasted or calcined, breaking up into calcium oxid and nitrogen oxids which latter as in the case of the production of borax glass are led through the pipe line 24 to the digester 12. The lime is led through the chutes 28 and 32 to a suitable storage place, not shown, or may be used for making basic calcium nitrate, presently to be described.

It may be remarked here that the lime produced by my process is a product of remarkable purity, and in a physical condition that makes it especially adapted for use in sugar refining or the extracting of sugar from molasses. The lime is fluffy and is almost chemically pure, and sells from $1.00 to $2.00 more a ton than the ordinary lime. In view of the fact that southern California has many beet sugar factories which are in the market for lime, my process has the additional advantage of producing a by-product for which this is a ready market.

If it is desired to use calcium nitrate as a fertilizer, the nitrate in solution is run from the evaporating pan 17 through a pipe line 33 to a basic calcium nitrate pan 34 provided with a steam jacket, where the calcium nitrate solution is mixed with a suitable quantity of lime conveyed thereto through the lime chute 32. By evaporating the mixture of calcium oxid and calcium nitrate, a basic calcium nitrate, valuable as a fertilizer is formed. Suitable proportions for the basic calcium nitrate are one molecule of each. 35 designates a main steam supply pipe from which a pipe line 36 leads to the basic calcium nitrate pan 34 and a pipe line 37 to the interior of the digester 12 and to the steam jacket surrounding the same; from the pipe line 37 a branch pipe 38 leads to the evaporating pan 17.

In case the ore treated consists of a borosilicate, I find it advisable to evaporate to dryness the mixture in the digester 12 which has been treated with nitric acid. By this treatment, the soluble silicates in solution are dehydrated and made insoluble. The soluble nitrates and boric acid are dissolved from this mass by adding boiling water and filter pressing through the filter press 14, the insoluble matter staying in the pressed cake, the soluble nitrates and the boric acid being led to the evaporating pan 17 as in the case of the calcium borate ores.

The solution of calcium nitrate when concentrated becomes colloidal and it is difficult to handle. It is therefore advisable to add from 15 to 25% of lime to the nitrate liquors in the last stages of evaporation in the evaporating pan 17. The resulting basic calcium nitrate may now be evaporated to a friable solid which may be easily manipulated and which has less tendency to absorb moisture than the normal calcium nitrate.

While I have described the best method of treating borax ores as now known to me, it will be understood that I do not limit myself to the particular process described, as various changes may be made by those skilled in the art without departing from the spirit of my invention. For instance, a mixture of finely ground calcium borate, such as colemanite ore, if heated in the presence of sodium nitrate, would result in a decomposition of this nitrate forming a sodium borate and calcium nitrate, and if the heat is brought up high enough, this calcium nitrate would decompose into calcium oxid and nitrous fumes. The oxid of calcium would combine with the sodium borate and form a boron sodium calcium glass which would have to be again treated with nitric acid to separate the constituent parts from one another.

It is thus seen that I have devised an economical and flexible process of treating borate ores which yields practically no valueless by-products, and which allows the production of boric acid, borax, lime, calcium nitrate, as market conditions may require without the necessity of materially modifying the steps in the process or using additional apparatus.

I claim:

1. A process of treating borax ores comprising digesting a calcareous borax ore with nitric acid, thereby forming boric acid and calcium nitrate, filtering the mixture, separating the boric acid from the calcium nitrate by crystallization, mixing boric acid and sodium nitrate in proportion to form borax, heating the mixture in a closed chamber under sub-atmospheric pressure and in the presence of oxygen and aqueous vapor and using the nitric acid formed, in the treatment of another batch of ore in a succeeding operation.

2. A process of treating borax ores comprising digesting a silicious calcium borate with nitric acid, thereby forming boric acid and calcium nitrate, evaporating the mixture to a dryness, in order to render the silicates insoluble, digesting the mass with boiling water, filtering the same, separating the boric acid from the calcium nitrate and mixing the boric acid with sodium nitrate in proportions to form borax, heating the same in a closed vessel under sub-atmospheric pressure and in the presence of oxygen and aqueous vapor and using the nitric acid formed in the treatment of another batch of ore.

3. A process of treating borax ores comprising digesting a calcareous borax ore with nitric acid, thereby forming boric acid and the nitrate of the base of the borax ore, separating the boric acid from the nitrate, mixing the boric acid and a nitrate of an alkali metal in proportion to form borax and heating the mixture in a closed chamber in the presence of oxygen and aqueous vapor and using the nitric acid formed in the treatment of another batch of ore.

4. A process of treating borax ores, comprising digesting a silicious lime borate with nitric acid, thereby forming boric acid and calcium nitrate, evaporating the mixture to dryness in order to dehydrate the silicates, digesting the mass with hot water, separating the boric acid from the mixture and mixing the boric acid with a nitrate of an alkali metal to form the corresponding alkali metal borate, heating the same in a closed vessel in the presence of oxygen and aqueous vapor and using the nitric acid formed in the treatment of another batch of ore.

5. A process of treating borax ores, comprising digesting a calcareous borax ore with nitric acid, thereby forming boric acid and calcium nitrate, and separating the boric acid from the calcium nitrate.

In testimony whereof I have signed my name to this specification.

HENRY BLUMENBERG.

Copies of this patent may be obtained for five cents each, by addressing the "Commissioner of Patents, Washington, D. C."